Oct. 2, 1951     C. E. LARRABEE     2,569,815
SYNCHRONOUS MOTOR CONTROLLED SECONDARY CLOCK

Filed Jan. 30, 1948     3 Sheets-Sheet 1

INVENTOR
CLINTON E. LARRABEE
BY
Edward R. Saunders
AGENT

Oct. 2, 1951  C. E. LARRABEE  2,569,815
SYNCHRONOUS MOTOR CONTROLLED SECONDARY CLOCK
Filed Jan. 30, 1948  3 Sheets-Sheet 2

INVENTOR
CLINTON E. LARRABEE
BY
Edward R. Lowndes
AGENT

Oct. 2, 1951        C. E. LARRABEE        2,569,815
SYNCHRONOUS MOTOR CONTROLLED SECONDARY CLOCK
Filed Jan. 30, 1948        3 Sheets-Sheet 3
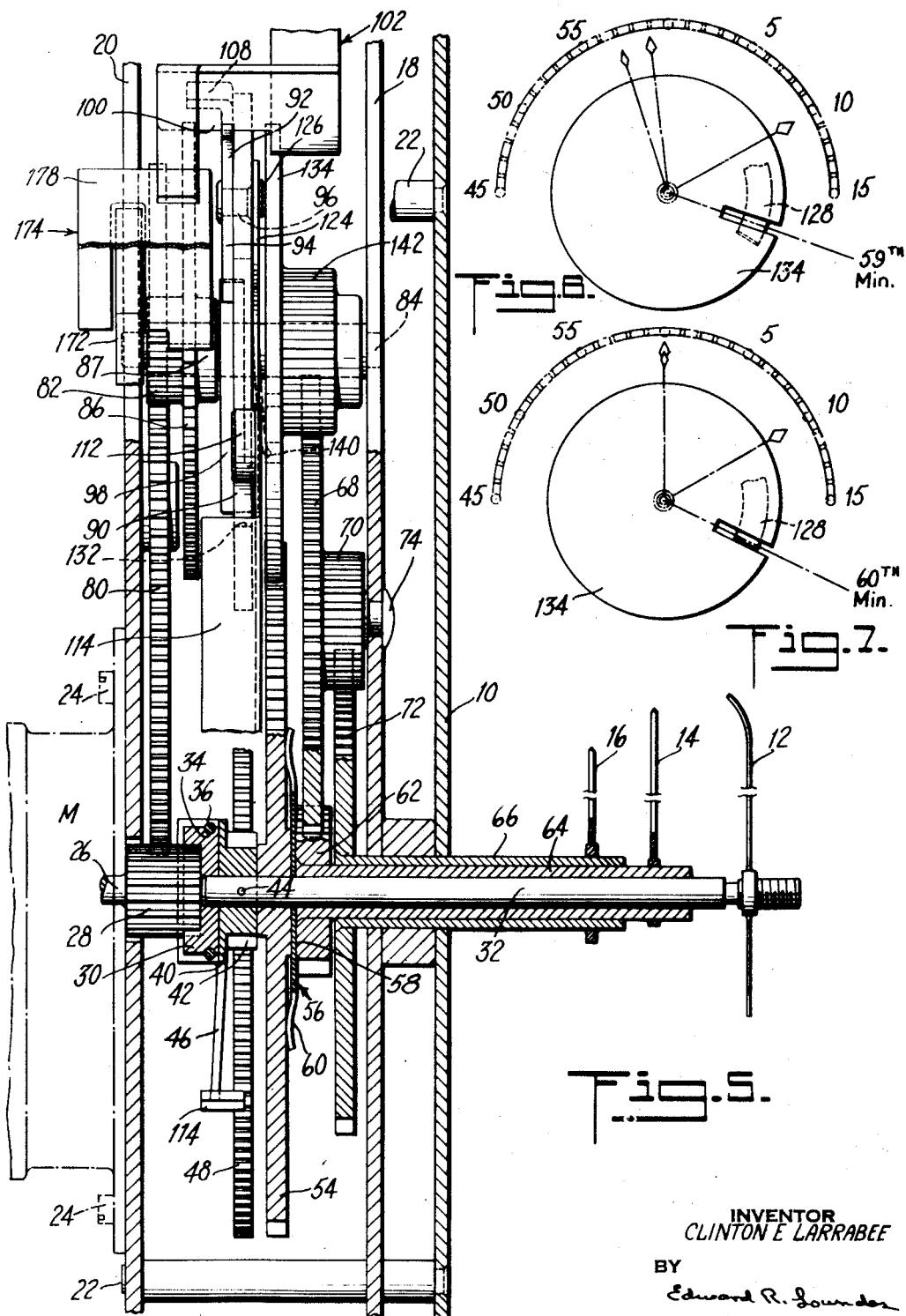
INVENTOR
CLINTON E. LARRABEE
BY
Edward R. Lounder
AGENT Patented Oct. 2, 1951

2,569,815

UNITED STATES PATENT OFFICE 2,569,815

SYNCHRONOUS MOTOR CONTROLLED SECONDARY CLOCK

Clinton E. Larrabee, Binghamton, N. Y., assignor to International Business Machines Corporation, New York, N. Y., a corporation of New York Application January 30, 1948, Serial No. 5,447

10 Claims. (Cl. 58—26)

1

The present invention relates to time-keeping apparatus and, more particularly, to secondary clocks and similar time-keeping units of the type normally driven by individual driving motors, as for example, synchronous alternating current motors which are automatically regulated at selected intervals in response to time signals transmitted from a source of correct or standard time. The invention is designed as an improvement over the structure shown and described in a copending application of R. B. Johnson and E. F. Geiger, Serial No. 664,933, filed April 25, 1946, now Patent No. 2,566,940 dated September 4, 1951 for Secondary Time-Keeping Apparatus.

In the copending application above referred to the clock mechanism is adapted to be uniformly and continuously driven by means of a synchronous alternating current motor which receives its impulses from the commercial 60-cycle power line. Means are also provided whereby an electrical signal is transmitted to the secondary clock over the regular power line at a moment which occurs slightly before the fifty-ninth minute of each standard time hour and which terminates precisely at the fifty-ninth minute of the hour, such an impulse serving to initiate a correction cycle whereby, if the secondary clock is running slow with respect to standard time at the fifty-ninth minute of the hour, it will be brought up to the correct time during the sixtieth minute of the hour so that when the sixtieth minute is completed and the first minute of the next succeeding hour commences, the clock will be accurately synchronized with the standard time source.

The special or time correcting signal which is imparted to the secondary clock over the regular commercial channel is preferably of a high frequency nature and it is employed to energize a magnet which, by tripping a latch, initiates the correction cycle. In the structure of the above mentioned copending application such energization of the magnet and consequent tripping of the latch occurs substantially instantaneously, i. e., within a fraction of one current cycle and once the magnet has been energized and the latch tripped, the correction cycle proceeds to its logical conclusion. As a consequence of this, when stray or transient frequencies which are known to exist in connection with most commercial power lines are encountered that are of the same frequency as the frequency of the correction-initiating signal, a correction cycle will be initiated regardless of the time at which the transient frequency is encountered. If such a transient signal is encountered haphazardly at a moment during the middle of any

2 particular hour, a correction cycle will set in and the secondary clock will be brought to an unwarranted even hour which is inconsistent with correct standard time.

The present invention is designed to overcome the above noted limitation that is attendant upon the use of secondary clocks such as are disclosed in the above mentioned copending application and, toward this end, it contemplates the provision of a time delay means whereby transient or stray frequencies encountered haphazardly during the middle of an hour will have no effect upon the initiation of the correction cycle. The provision of a secondary clock of this character is the principal object of the invention.

In carrying out the above mentioned object, cognizance is taken of the fact that such transient frequencies seldom, if ever, are of long duration, existing as they do for a mere fraction of a cycle. Thus, in carrying out the principles of the invention, just before the fifty-ninth minute of each hour the signal of predetermined frequency is applied to the secondary clock for a prolonged period of time, for example, two to three seconds, and means are provided whereby any application of a signal of similar frequency applied to the secondary clock which is not maintained for such a prolonged duration will fail to trip the latch which initiates the correction cycle and, as a consequence, erroneous or undesired advancing of the clock does not occur.

A still further object of the invention is to provide a secondary time-keeping apparatus of the type set forth in the above mentioned copending application which is of improved construction and arrangement of parts.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 is an enlarged sectional view taken substantialy along the line 5—5 of Fig. 1. In this view the clock dial face and indicating hands have been applied to the clock.

Fig. 6 is a schematic view showing the relationship between a pair of correction discs employed in connection with the present invention when the minute and hour hands of the clock are positioned to represent approximately three seconds before the fifty-ninth minute of any particular hour and the clock is on time.

Fig. 7 is a schematic view, similar to Fig. 6, showing the relationship between the correction discs when the minute and hour hands represent an even hour and the clock is either normally on time or has just been brought to correct time at the end of a correction cycle.

In all of the above described views like characters of reference are employed to designate like parts through.

Figure 1:
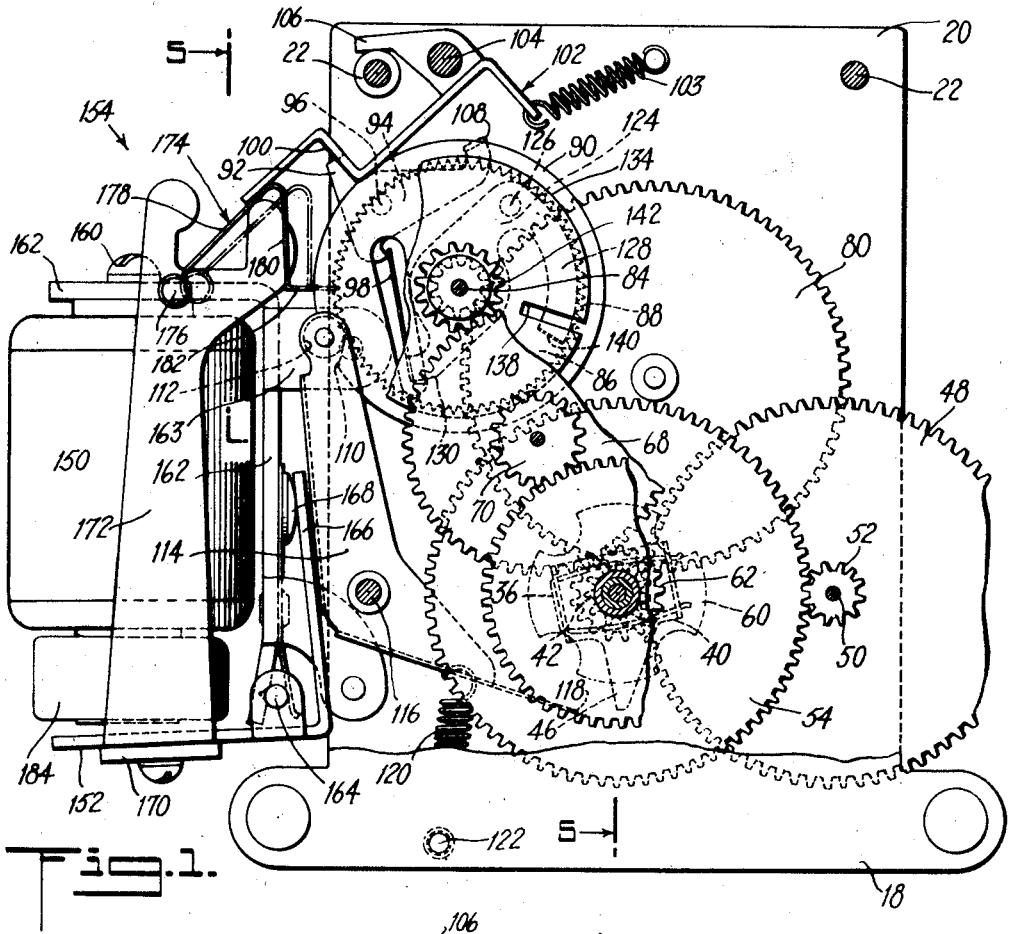
Fig. 1 is a front elevational view of a secondary clock mechanism constructed in accordance with the principles of the present invention. In this view, the dial face clock hands, clock casing and other parts have been removed to more clearly reveal the nature of the invention.

Referring now in detail to the drawings wherein a preferred form of an automatically regulated secondary clock construction is shown, the clock comprises the usual face plate or dial face 10, seconds hand 12, minutes hand 14 and hours hand 16. The parallel front and rear support plates are indicated at 18 and 20 respectively and they are suitably secured in their predetermined spaced relationship by pillars 22. An electric driving motor M is suitably supported, as for example, by means of screws 24, on the rear plate 20 and is preferably of the self-starting synchronous type which is adapted to be driven at a predetermined time rate from the available frequency regulated commercial alternating current power line.

The output shaft 26 of the motor M has mounted thereon a relatively wide splined pinion 28 which, when the motor is assembled on the rear plate 20, fits into and meshes with an internally threaded cup-shaped gear 30 rotatably mounted on a seconds shaft 32, the latter being rotatably supported in the front and rear plates 18, 20. The gear 30 is formed with an external circumferential groove 34 therein (Figs. 4 and 5) and a substantially U-shaped spring clip or friction member 36 has its opposite arms straddling the groove 34 and bearing frictionally inwardly against the surface of the groove. The opposite ends of the friction member 36 project through openings 38 formed in a frame or cage member 40 which has integrally formed thereon a gear portion 42 which is pinned as at 44 to the seconds shaft 32. The motor shaft 26 is adapted to be rotated when the motor M is energized at the rate of one revolution per minute and, as a consequence, the pinion 28 imparts motion to the cup-shaped gear 30 which in turn frictionally drives the frame member 40 and its gear portion 42, together with the shaft 32 at a corresponding rate of one revolution per minute. The friction drive, including the gear 30, friction spring 36 and frame member 40, permits relative movement between the seconds shaft 32 and the pinion 28 when such relative movement is required for time-correcting operations, as will be subsequently described.

Figure 4:
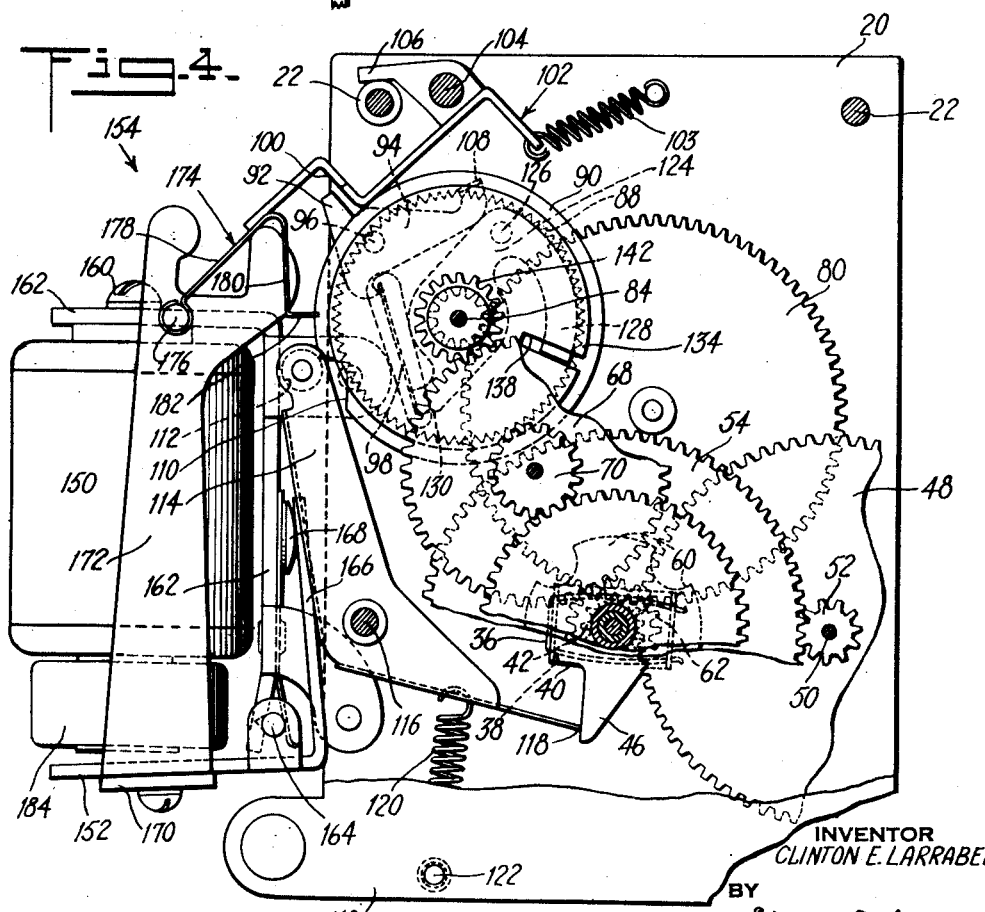

Formed as an integral part of the frame-like member 40 is an outwardly extending seconds stop arm 46. The seconds hand 12 is mounted upon the upward end of the seconds shaft 32. Thus, the stop arm 46 and seconds hand 12 move together with the seconds shaft 32, and the stop arm 46 thus occupies a definite angular position with respect to the seconds hand 12 for any given time-indicating position of the latter. This definite angular position existing between the seconds hand 12 and stop arm 46 is illustrated in Fig. 4 wherein the position of the seconds shaft 32 is such that the seconds hand is on the even minute position occurring at the zenith of the clock dial.

The gear portion 42 of the frame-like member 40, and which may be considered as the seconds driving gear of the clock works, is in mesh with a large gear 48 (Figs. 1 and 5) mounted on a shaft 50 extending between the front and rear plates 18, 20 of the clock works mechanism. The shaft 50 carries a small gear 52 which meshes with a large gear 54 rotatably mounted on the seconds shaft 32. A friction member designated in its entirety at 56 is in the form of a disc-like element having a flat hub portion 58 from which there projects radially a series of bowed spring fingers 60 which bear against the front face of the gear 54, thus normally forcing the central or hub portion 58 of the friction ring 56 to the right, as viewed in Fig. 5, and causing the same to bear against a minutes driving gear 62 fixedly secured on a minutes sleeve 64 surrounding the seconds shaft 32 and in which the latter is rotatably journaled. The minutes sleeve 64 carries the minutes hand 14 at its forward end which terminates short of the seconds shaft 32. The gears 42, 48, 52 and 54 are so designed as to frictionally drive the minutes sleeve 64 from the seconds shaft 32 through the friction member 56 at the proper time rate of one revolution per hour. The friction member 56 between the gear 54 and the gear 62 permits relative motion between the constantly rotating seconds driving gear 42 and the minutes driving gear 62 when necessary during the time-correcting cycle or period, as will appear presently.

An hours sleeve 66 is rotatably mounted on the minutes sleeve 64 and is driven at the proper time rate of one revolution every twelve hours by gearing including a large gear 68 which meshes with the minutes driving gear 62 and a small gear 70 which meshes with the relatively large hours driving gear 72 carried on the hours sleeve 66. The gears 68 and 70 are carried on a common stub shaft 74 secured in the front plate 18. The hours hand 16 is mounted on the forward end of the hours sleeve 66 which terminates short of the minutes sleeve 64.

Referring now particularly to Figs. 1 and 5, the pinion 28, in addition to driving the cup-shaped gear 30, as previously described, meshes with and drives a relatively large gear 80 journaled on the rear plate 20. The gear 80 in turn meshes with a small gear 82 fixedly mounted on a countershaft 84 extending across the clock works and rotatably journaled in the front and rear plates 18 and 20 respectively. A relatively large toothed disc 86 having a hub portion 87 formed thereon is fixedly secured to the shaft 84 and the teeth 88 on the periphery of the disc 86 are relatively small and closely spaced to effect a tractional function in connection with the time delay mechanism, which will be made clear presently. It should be borne in mind at this point that the pinion 28 and gears 80 and 82 remain in constant rotation at all times while the motor M is energized and these gears are so designed that the countershaft 84 and toothed disc 86, together with its hub 87, is adapted to rotate continuously at the rate of one revolution per minute.

The toothed disc 86 is adapted to impart its relatively fast rate of rotation to a time-correcting disc 90 which is loosely mounted on the constantly rotating countershaft 84 forwardly of the disc 86 and which is maintained axially spaced from the latter by means of the previously mentioned hub 87. This time-correcting disc is normally held against rotation at a predetermined angular position by means of a latch finger 92 carried on a pivoted clutch piece 94 which is pivotally secured as at 96 to the rear face of the time-correcting disc 90. The clutch piece 94 is spring-pressed as at 98 in such a manner as to normally bias the same in a clockwise direction, as viewed in Fig. 1. The latch finger 92 normally bears against a shoulder 100 associated with a latch member 102 which is spring-pressed as at 103 and is pivoted on a shaft 104 (see also Fig. 4) extending between the front and rear plates 18 and 20. The latch member 102 is formed with a laterally extending finger 106 designed for engagement with a stop piece which, for convenience, may be one of the spacing pillars 22 previously mentioned.

The clutch piece 94 is formed with a laterally and rearwardly turned clutch tooth 108 designed for tractional engagement with the periphery of the toothed disc 86 when the clutch piece 94 is released by the latch member 102. Normally, with the latch finger 92 bearing against the shoulder 100 of the latch member 102, the clutch piece 94 is urged in a counter-clockwise direction, as viewed in Fig. 1, against the action of the spring 98 to cause the clutch tooth 108 to disengage the toothed periphery 88 of the constantly rotating traction disc 86 so that the correction disc 90 is forcibly held or latched against rotation. However, as will be seen presently, when the latch member 102 is tripped or swung in a clockwise direction, as viewed in Figs. 1 to 4 inclusive, the shoulder 100 will move away from the latch finger 92 allowing the spring 98 to move the clutch piece 94 in a clockwise direction and effect tractional clutching engagement between the correction disc 90 and the traction disc 86, so that these two elements will then rotate in unison uniformly throughout one complete revolution during the course of one minute. Such rotation in unison occurs only during the correction cycle which commences shortly before the fifty-ninth minute of each hour and which terminates precisely as the next hour commences.

The disc 90 is provided with a notch or recess 110 (Figs. 3 and 4) in the periphery thereof adapted to receive therein a roller 112 carried at one end of a detent lever 114 in the form of a bell crank which is pivoted medially of its ends on a rod 116 extending between the front and rear plates 18, 20, the other end of which lever constitutes a detent abutment 118 which, when the roller 112 occupies its normal position within the recess 110, is out of the path of movement of the previously mentioned stop arm 46 carried by the frame-like member 40 associated with the seconds shaft driving mechanism. A coil spring 120 which is anchored at one end to a stud 122 carried on the front plate 18 has its other end secured to the detent lever 114 and normally biases this lever in a clockwise direction, as viewed in Fig. 1, to maintain the roller 112 in tractional engagement with the periphery of the correction disc 90 during the correction cycle and to maintain this roller within the recess 110 at all other times.

Secured to the forward face of the correction disc 90 is a pick-up spring piece 124 of irregular design which is riveted or otherwise secured as at 126 to the disc. The spring piece 124 includes an arcuate forward and outwardly extending spring pick-up arm 128 and a rearwardly extending portion 130 which projects through an opening 132 formed in the disc and which on the rear side of the disc is provided with a lateral extension that constitutes the spring 98 which serves to bias the pivoted clutch piece 94.

Spaced from the correction disc 90 and forwardly thereof is a second correction disc 134 which is loosely mounted on the countershaft 84. The second correction disc 134 is formed with a radially extending slot 138 which extends inwardly a slight distance from the periphery thereof and which is designed to cooperate with an out-turned end 140 provided on the arcuate spring pick-up arm 128. The distance between the plane of the two correction discs 90 and 134 and the reach of the spring arm 124 is such that the out-turned end 140 of this arm is adapted to frictionally bear against the rear surface of the second correction disc 134 at all times during normal operation of the clock when the latter is correct or on time and during a varying portion of each correction cycle when the latter is effective to perform a correcting function. At other times during the correction cycle the out-turned end 140 of the spring arm 128 is adapted to enter the slot 138 in the correction disc 134 and abut against one edge of this slot to impel the disc rotatably for time-correcting purposes in a manner that will appear presently. The spring arm 128 and slot 138 comprise the two coacting parts of a one-way coupling between the two correction discs 90 and 134.

The correction disc 134 has secured to, and is consequently rotatable with, a relatively small gear 142 which meshes with the relatively large gear 68 that in turn meshes with the minutes driving gear 62. It will be seen, that, since gears 62 and 142 have a like number of teeth, the disc 134 rotates freely on the countershaft 84 at the same rate as the sleeve 64 and hand 14; that is, at the rate of one revolution per hour, while the disc 90 is maintained normally stationary. The angular position of the slot 138 therefore bears a definite relationship to the angular position of the hours hand 16.

It has been seen how the toothed disc 86 is adapted to be positively continuously rotated at the rate of one revolution per minute as long as the motor M remains energized. It has also been seen how the correction disc 134 is adapted to be continuously rotated by a friction drive at the rate of one revolution per hour as long as the motor M is energized and the clock is on time. Even if the clock is running slow with respect to chronological time, the second correction disc 134 is adapted to be driven at the rate of one revolution per hour and its speed will not be increased until such time as the two correction discs are coupled and motion is applied to the disc 134 from the disc 90. For practical purposes, then, and for purposes of terminology in the accompanying claims, the toothed disc 86 may be regarded as a seconds member of the clock system and the correction disc 134 may be regarded as a minutes member of this system, an object of the invention being to transmit motion from the former to the latter when, and only when, necessary to effect advancement of the minutes hand 14 at a comparatively rapid rate of speed and consequent correction of the time indication. In this regard, the seconds member or disc 86 is not to be confused with the seconds driving gear, which is the gear portion 42 of the frame 40, nor is the minutes member to be confused with the minutes driving gear 62.

In Fig. 1 the spring arm 128 and slot 138 are in the position they occupy at a chronological time of approximately three seconds before the fifty-ninth minute of any particular hour with the clock running on time. The relationship is further illustrated schematically in Fig. 6. In Fig. 4 the spring arm and slot are in the position they occupy an instant before a chronological even hour. In Fig. 7 the relationship between the spring arm and slot is illustrated at a chronological even hour with the clock running on time or at the end of a correction cycle whether the clock has previously been on time or slow.

It has been explained previously that at the fifty-ninth minute after each chronological hour, the latch member 102 is adapted to become tripped to release the latch finger 92 of the clutch element 94 to permit the correction disc 90 to commence its cycle of rotation, during which it rotates one complete revolution and is again stopped at the end of the fifty-ninth minute of the hour. Tripping of the latch member 102 is effected under the control of an electromagnet 150 which, upon energization thereof, attracts its armature 152 (Fig. 1) and sets into action a time delay mechanism designated in its entirety at 154, the nature of which will be explained fully hereinafter. From the instant of energization of the magnet 150 until the instant of tripping of the latch member 102, a period of approximately three seconds intervenes for the purpose of preventing stray or transient frequencies coming over the power line and of shorter duration than three seconds from affecting the latch member 102. Actually then, the energizing signal, which is of such high frequency as to not disturb the normal functions of the 60-cycle current frequency constantly issuing over the line, is applied to the magnet approximately three seconds before the commencement of the fifty-ninth minute after each chronological hour but the latch member 102 is not tripped until approximately the commencement of the fifty-ninth minute after the chronological hour.

Fig. 1 shows the normal position of the various parts of the clock works and of the two correction discs 90, 134 at approximately three seconds before the fifty-ninth minute after any particular chronological hour. It will be remembered that the disc 134, having the slot 138, is being constantly rotated in a clockwise direction, as viewed in this figure, at a rate of one revolution per hour. At the fifty-ninth minute after the hour when the latch member 102 is tripped, the latch finger 92 is released and the disc 90 commences to rotate in a clockwise direction at a rate of one revolution per minute. The end of the spring piece 124 thus walks rapidly away from the slot 138 and continues to rotate at its relatively rapid rate for one complete minute existing from the commencement of the fifty-ninth minute after the hour and ending at the end of the fifty-ninth minute. By the time the spring has swept through an arc of 360° the slot 138 has advanced throughout an arc of one-sixtieth of a revolution or 6°. Thus, when the latch finger 92 again encounters the restored latch member 102 (as it is about to do in Fig. 4), the end of the spring arm 128 will have entered the slot 138 which, by that time, has been advanced throughout an angle of 6°. As soon as the latch finger 92 engages the latch shoulder 100 of the latch 102, the slot 138 will commence to walk away from the end of the spring arm 128 as the next chronological hour commences.

Figure 2:
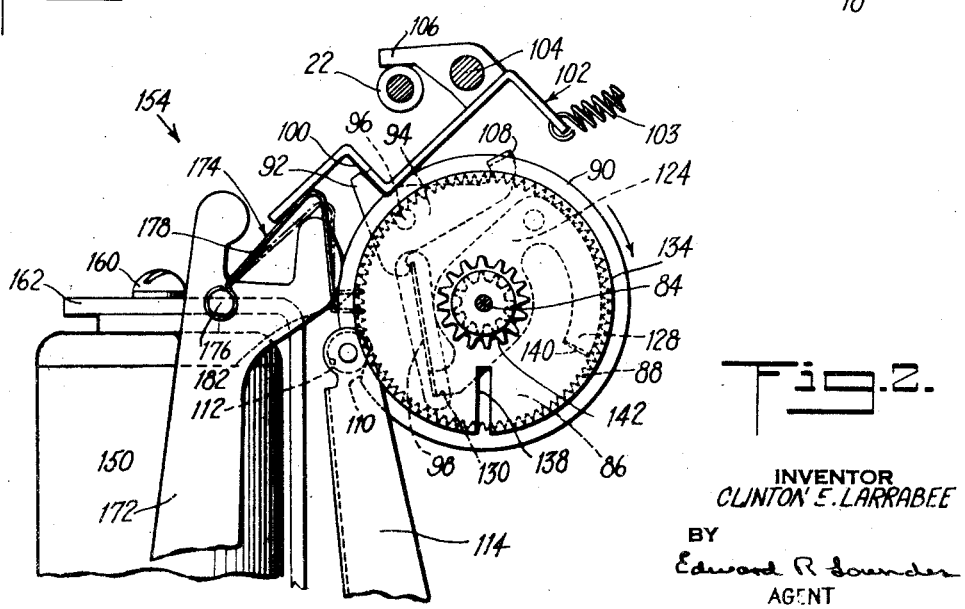
Figs. 2, 3 and 4 are similar fragmentary views of the secondary clock with the parts thereof shown in various selected positions to illustrate the operation of the mechanism.

If the clock happens to be running slow, as for example, by approximately fifty minutes at the fifty-ninth minute after a particular chronological hour, the relationship of the two correction discs will be as it is shown in Fig. 2 with the slot 138 occupying a position approximately 80° in advance of the end of the spring 124. When the latch 102 is released and the disc 90 commences to rotate at the rate of one revolution per minute, the end of the spring 124 will shortly overtake the slot 138, engage the receding edge thereof and impel the disc 134 throughout the proper angle to cause the minutes hand 14 to arrive at its proper position precisely at the end of the fifty-ninth minute, the driving connection during such correction time existing from the disc 134 through the gears 142, 68, 62 and sleeve 64 to the minutes hand 14.

Figure 3:
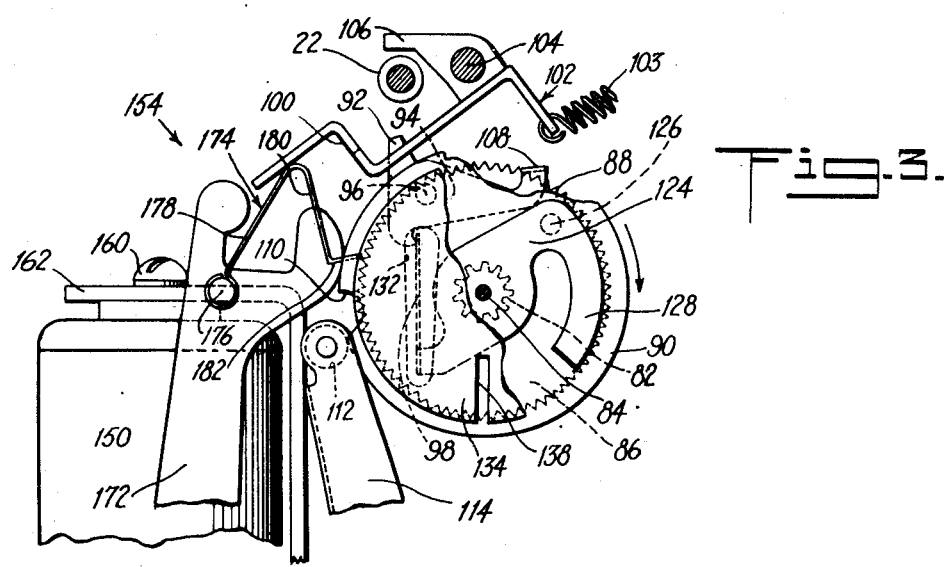

With the clock running slow the disposition of the seconds hand 12 when the fifty-ninth minute of a particular chronological hour is encountered may vary. In any event, after the correction cycle has started, the roller 112 (Fig. 1) will ride out of the recess 110 as soon as the disc 90 commences to rotate as shown in Fig. 3. This will cause a counter-clockwise tilting of the lever 114 so that the end or abutment 118 thereof is disposed in the path of the arm 46 formed on the cup-shaped gear 30. Since the arm 46 continues to rotate about the axis of the seconds shaft and at the same rate, it will eventually engage the end 118 of the lever 114 at a time prior to restoration of the minutes hand 14 to its even hour position. It will be remembered, of course, that when the arm 46 is in alignment with the end of the lever 114, the seconds hand assumes its even minute position. Thus, whatever the position of the seconds hands 12 at the time the correction cycle is initiated it will engage the end 118 of the lever 114 before the arrival of the minutes hand 14 at the even hour position, unless, of course, this seconds hand is on time, in which case the two hands will arrive at the hour position simultaneously. It will be appreciated that when the arm 46 engages the end 118 of the lever 114, the gear 30 will continue to rotate, but the friction spring 36 will slip in the groove 34. Just as the correction disc 90 arrives at its home position, i. e., the even hour, the roller 112 will reenter the recess 110 and withdraw the end or abutment 118 of the lever 114 from the path of movement of the arm 46, thus rendering the friction spring 36 effective to rotate the seconds shaft 32 and consequently the seconds hand 12.

The previously mentioned time delay mechanism 154, whereby reception of a high frequency signal over the commercial power line by the electromagnet 150 at approximately three seconds before the fifty-ninth minute of each hour will not effect tripping of the latch member 102 until three seconds later, is shown in Fig. 1 in the normal position which it assumes throughout the first fifty-eight minutes of each hour. The electromagnet 150 is secured as at 160 in a bracket 162 which, in turn, is secured by means of ears 163 to the rear plate 20 of the clock works. The armature 152 of the magnet 150 is pivoted on a pair of trunnions 164 which project laterally from the lower end of the bracket 162 and is provided with an upwardly extending stop arm 166 designed for engagement with a limit stop 168 carried on the bracket 162 when the armature is deenergized. A weight 170 carried by the armature 152 serves by gravity to restore the armature after energization of the magnet to its normal position.

An actuating arm 172 is secured to the armature 152 and extends upwardly therefrom along one side of the magnet 150. A trip member 174 is pivoted on a stud 176 carried near the upper end of the actuating arm 172 and is provided with an upwardly extending portion 178, a downwardly extending portion 180 and a laterally extending toothed portion 182, the forward edge of which is designed for engagement with the teeth 88 formed on the toothed disc 86. When the magnet 150 is energized and the armature 152 is attracted so as to throw the upper end of the lever 114 to the right as viewed in Fig. 1, the forward edge of the toothed portion 182 engages the toothed periphery of the disc 86 as shown in dotted lines in Fig. 1. Such tractional engagement of the trip member 174 with the periphery of the disc 86 causes the forward end of the trip member 174 to be lifted upwardly so that it is gradually swung in a counter-clockwise direction at a time occurring approximately three seconds after initial energization of the magnet 150. The upwardly extending portion 178 of the trip member engages the latch member 102 and moves the same in a clockwise direction, thus withdrawing the latch shoulder 100 from the path of movement of the latch finger 92 and initiating the correction cycle, as previously described. When deenergization of the magnet 150 occurs three seconds after its initial energization, the latch 102 will have been tripped. At this time the arm 172, under the influence of gravity, is restored to its initial position and the trip member 174 moves away from the periphery of the toothed disc 86 and the trip member returns to its position of rest wherein it bears against the upper end of the arm 172.

In addition to the mechanical delay means described above for delaying the effective tripping of the latch member 102 until approximately three seconds after the initiating high frequency signal has been received, an electrical means of delaying the attraction of the magnet 150 is contemplated. This electrical delay means is in the form of a copper cylinder or jacket 184 which surrounds the core of the magnet 150 at the armature end thereof and acts as a shorted turn thereon. The principle of operation of shaded coil magnets is well known in the art and need not be described herein, suffice it to say that by the provision of the copper jacket 184 transient frequencies lasting less than approximately one-half of a cycle or $1/120$ of a second will prevent effective energization of the magnet 150 and consequent chattering of the armature 152 and its associated parts.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a secondary clock mechanism, a rotatable seconds member, a rotatable minutes member, means normally rotating each of said members at their normal time-keeping rates of one revolution per minute and one revolution per hour respectively, a rotatable clock-advancing member, clutch means operative for connecting said clock advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, an armature for said electromagnet, a trip member pivotally connected to said armature and movable bodily therewith, said trip member being movable when said armature is attracted by the electromagnet into operative engagement with said seconds member whereby said tripping means is actuated.

2. In a secondary clock mechanism, a rotatable seconds member, a rotatable minutes member, said members being mounted for rotation on a common axis, means normally rotating said members at their normal time-keeping rates of one revolution per minute and one revolution per hour respectively, a rotatable clock advancing member, clutch means operative for connecting said clock advancing member and seconds member in driving relationship for causing the latter to rotate at the speed of the former, a latch member normally rendering said clutch mentioned means inoperative, means for tripping said latch member to permit said clutch means to become operative, said last mentioned means comprising an electromagnet responsive to the reception of a signal at a predetermined chronological time, an armature for said electromagnet, a trip member pivotally connected to said armature and movable bodily therewith, said trip member being movable when said armature is attracted by the electromagnet into operative engagement with said seconds member whereby said tripping means is actuated.

3. In a secondary clock mechanism, a rotatable seconds member, rotatable minutes member, means normally rotating each of said members at their normal time-keeping rates of one revolution per minute and one revolution per hour respectively, a rotatable clock advancing member, a clutch element mounted on said advancing member, spring means normally urging said clutch element into engagement with said seconds member whereby the movements of the latter will be imparted to the former, a one-way clutch mechanism common to said clock advancing member and minutes member for driving the latter at the speed of the former when the former is rotated by said clutch element, a latch member normally positioned in the path of movement of said clutch element and designed for engagement with the latter to render said spring means inoperative and to prevent rotation of said clock advancing member, an electromagnet responsive to the reception of a signal at a predetermined chronological time, an armature for said electromagnet, a trip member pivotally connected to said armature and movable bodily therewith, said trip member being movable when said armature is attracted by the electromagnet into operative engagement with said seconds member whereby said tripping means is actuated.

4. A one-revolution clutch mechanism comprising in combination a constantly rotating driving member, a driven member mounted for rotation about the axis of revolution of said driving member, a coupling member pivotally secured to said driven member, means normally urging said coupling member into geared engagement with said driving member to transmit motion from the latter to the driven member, an abutment formed on said coupling member, a movable latch positioned in the path of said abutment for holding the coupling member disengaged from the driving member and consequently for maintaining the latter stationary in a predetermined angular position, means responsive to the reception of a signal of a predetermined duration for moving the latch member out of the path of movement of said abutment at a time subsequent to said predetermined time comprising an electromagnet having a movable armature, a trip member pivoted to said armature and movable bodily therewith from a retracted position when the electromagnet is deenergized to an intermediate position where it engages said driving member when the electromagnet is energized whereby such engagement will cause tractional movement of the trip member into engagement with the latch to move the latter out of the path of movement of said coupling member.

5. In a secondary clock mechanism, a synchronously driven motor adapted to be operated continuously according to chronological time; a rotatable seconds member and a rotatable minutes member mounted for rotation about a common axis; means operatively connecting each of said members and the driving motor in driving relationship for rotating the same at their normal time-keeping rates of one revolution per minute and one revolution per hour, respectively; the driving means for said minutes member including a friction coupling, a clock-advancing member mounted for rotation about said common axis; disengageable means operative for connecting said seconds member and clock-advancing member in driving relationship for rotating the latter at the same rate as the former; an abutment on said minutes member, a cooperating abutment on said clock-advancing member designed for engagement with said other abutment when said latter member is rotated to cause said minutes member to be rotated at the rate of said seconds member against the action of said friction driving means; latch means normally maintaining the connecting means between said seconds member and clock-advancing member disengaged and maintaining the latter stationary at a predetermined angular position; and means for rendering said latch means inoperative, said latter means comprising an electromagnet responsive to the reception of a signal of a predetermined duration, an armature for said electromagnet, a trip member for said latch means pivotally connected to the armature and movable bodily therewith, said trip member being movable when said armature is attracted by the electromagnet into engagement with said seconds member whereby the said latch means is rendered inoperative.

6. In a secondary clock mechanism, a synchronously driven motor adapted to be operated continuously according to chronological time; a rotatable seconds member and a rotatable minutes member mounted for rotation about a common axis; means operatively connecting each of said members and the driving motor in driving relationship for rotating the same at their normal time-keeping rates of one revolution per minute and one revolution per hour respectively; a clock-advancing member mounted for rotation about said common axis; disengageable means operative for connecting said seconds member and clock-advancing member in driving relationship for rotating the latter at the same rate as the former; coupling means between said clock-advancing member and minutes member operable when the latter is at a chronological position slower than standard time and upon engagement of said disengageable means for driving said minutes member at the rate of the seconds member for an angular distance sufficient to advance the minutes member to a chronoligical position coincident with standard time, a latch member normally maintaining said disengageable means disengaged and maintaining said clock-advancing member stationary at a predetermined angular position, said latch member being operable upon tripping thereof to release said disengageable means, and means for tripping said latch member comprising an electromagnet having a movable armature, a trip element pivotally mounted on said armature and movable bodily therewith from a retracted position out of engagement with said rotatable seconds member to an intermediate position in tractional engagement therewith upon energization of the electromagnet, said trip element being movable upon such engagement with the seconds member from its intermediate position to a fully advanced position wherein it engages and trips said latch member under the impelling influence of said seconds member.

7. In a secondary clock mechanism, a synchronously driven motor adapted to be operated continuously according to chronological time; a rotatable seconds member and a rotatable minutes member mounted for rotation about a common axis; means operatively connecting each of said members and the driving motor in driving relationship for rotating the same at their normal time-keeping rates of one revolution per minute and one revolution per hour respectively; the driving means for said minutes member including a frictional coupling, a clock-advancing member mounted for rotation about said common axis; disengageable means operative for connecting said seconds member and clock-advancing member in driving relationship for rotating the latter at the same rate as the former; coupling means between said clock-advancing member and minutes member operable when the latter is at a chronological position slower than standard time and upon engagement of said disengageable means for driving said minutes member at the rate of the seconds member for an angular distance sufficient to advance the minutes member against the action of said friction driving means to a chronological position coincident with standard time, a latch member normally maintaining said disengageable means disengaged and maintaining said clock-advancing member stationary at a predetermined angular position, said latch member being operable upon tripping thereof to release said disengageable means, and means for tripping said latch member comprising a trip element movable initially from a retracted position out of engagement with said rotatable seconds member to an intermediate position in geared engagement therewith, and movable tractionally upon engagement with said seconds member from its intermediate position to a fully advanced position wherein it engages and trips said latch member, and electromagnetic means for moving said trip element.

8. In a secondary clock mechanism, a synchronous driving motor adapted to be operated continuously according to chronological time; a rotatable seconds member and a rotatable minutes member mounted for rotation about a common axis; means operatively connecting each of said members and the driving motor in driving relationship for rotating the same at their normal time-keeping rate of one revolution per minute and one revolution per hour respectively, a clock-advancing member mounted for rotation about said common axis, means normally holding said clock-advancing member stationary at a predetermined angular position, motion-transmitting means for said clock-advancing member including a one-revolution clutch operable when engaged to operatively connect the motor and clock-advancing member in driving relationship for rotating the latter at the rate of one revolution per minute and to disconnect said motor and clock-advancing member when the latter is restored to its normal angular position, a lost motion coupling means between the clock-advancing member and the minutes member operable when the latter is at a chronological position slower than standard time and upon engagement of said clutch for driving the minutes member in one direction from said clock-advancing member at the rate of the latter for an angular distance sufficient to advance the minutes member to a chronological position coincident with standard time at the end of the revolution of said clock-advancing member, means responsive to the reception of a signal of a predetermined duration for causing engagement of said clutch, said means including a latch finger carried by said clock-advancing member and a cooperating latch member normally positioned in the path of movement of said latch finger, a trip member for disengaging said latch member from said latch finger, said trip member being movable from a retracted position wherein it is out of engagement with said minutes member to an intermediate position wherein it engages the latter and is moved thereby to an advanced position wherein it engages said latch member to move the same out of the path of movement of the latch finger and thereby release the same, and electromagnetic means for moving said trip member.

9. In a secondary clock mechanism, a seconds shaft, a minutes sleeve surrounding said shaft, a seconds driving gear coupled to said seconds shaft, a minutes driving gear including a friction coupling to said minutes sleeve, means normally rotating each of said driving gears at their normal time-keeping rates of one revolution per minute and one revolution per hour respectively, a countershaft mounted for rotation about an axis removed from the axis of said seconds shaft and minutes sleeve, a seconds member secured to said countershaft, a minutes member rotatably mounted on said countershaft, gear means operatively connecting said seconds driving gear and seconds member for driving the latter at the rate of one revolution per minute, a rotatable clock-advancing member rotatably mounted on said countershaft, clutch means operative for connecting said clock-advancing member and seconds member in driving relationship for causing the latter to rotate at the speed of the former, a latch member normally rendering said clutch means inoperative, means for tripping said latch member to permit said clutch means to become operative, gear means operatively connecting said minutes member and minutes driving gear in driving relationship, and a lost motion coupling means between the clock-advancing member and the minutes member operable when the latter is at a chronological position slower than standard time and upon engagement of said clutch means for driving the minutes member in one direction from said clock-advancing member at the rate of the latter for an angular distance commensurate with the amount by which said minutes member is slower than standard time to advance the minutes member to a chronological position coincident with standard time, said latch tripping means including an electromagnet adapted to trip said latch member and cause said minutes member to be driven at the rate of movement of said seconds member.

10. In a secondary clock mechanism, a seconds shaft, a minutes sleeve surrounding said shaft, a seconds driving gear coupled to said seconds shaft, a minutes driving gear including a friction coupling to said minutes sleeve, means normally rotating each of said driving gears at their normal time-keeping rates of one revolution per minute and one revolution per hour respectively, a countershaft mounted for rotation about an axis removed from the axis of said seconds shaft and minutes sleeve, a seconds member secured to said countershaft, a minutes member rotatably mounted on said countershaft, gear means operatively connecting said seconds driving gear and seconds member for driving the latter at the rate of one revolution per minute, a rotatable clock-advancing member rotatably mounted on said countershaft, clutch means operative for connecting said clock-advancing member and seconds member in driving relationship for causing the latter to rotate at the speed of the former, a latch member normally rendering said clutch means inoperative, means for tripping said latch member to permit said clutch means to become operative, gear means operatively connecting said minutes member and minutes driving gear in driving relationship, and a lost motion coupling means between the clock-advancing member and the minutes member operable when the latter is at a chronological position slower than standard time and upon engagement of said clutch means for driving the minutes member in one direction from said clock-advancing member at the rate of the latter for an angular distance commensurate with the amount by which said minutes member is slower than standard time to advance the minutes member to a chronological position coincident with standard time, said latch tripping means including an electromagnet responsive to the reception of a signal at a chronological time, an armature for said electromagnet, a trip member pivotally connected to said armature and movable bodily therewith, said trip member being movable when said armature is attracted by the electromagnet into engagement with said seconds member whereby said tripping means is actuated.

CLINTON E. LARRABEE.

REFERENCES CITED

The following references are of record in the file of this patent:

UNITED STATES PATENTS

| Number | Name | Date |
|---|---|---|
| 1,989,605 | Poole | Jan. 29, 1935 |
| 2,120,353 | Faller | June 14, 1938 |
| 2,274,221 | Stone | Feb. 24, 1942 |
| 2,332,278 | Stone | Oct. 19, 1943 |